(12) United States Patent
Lopushansky et al.

(10) Patent No.: US 7,835,598 B2
(45) Date of Patent: Nov. 16, 2010

(54) MULTI-CHANNEL ARRAY PROCESSOR

(75) Inventors: Richard L. Lopushansky, The Woodlands, TX (US); Larry A. Jeffers, Minerva, OH (US); John W. Berthold, Salem, OH (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/314,729

(22) Filed: Dec. 21, 2005

(65) Prior Publication Data

US 2006/0241889 A1 Oct. 26, 2006

Related U.S. Application Data

(60) Provisional application No. 60/637,959, filed on Dec. 21, 2004.

(51) Int. Cl.
*G02B 6/00* (2006.01)
*G01J 1/04* (2006.01)
*G01J 5/08* (2006.01)

(52) U.S. Cl. .............................. 385/12; 385/15; 385/27; 385/39; 250/227.11; 250/227.14; 250/227.18

(58) Field of Classification Search ................. 367/149; 356/345–346, 357–358, 355; 385/12–13, 385/39; 250/227.14, 227.18, 227.11; 73/841
See application file for complete search history.

(56) References Cited

U.S. PATENT DOCUMENTS

| 1,432,149 | A | 10/1922 | Bellingham |
|---|---|---|---|
| 3,923,400 | A | 12/1975 | Hardy |
| 4,210,029 | A | 7/1980 | Porter |
| 4,329,058 | A | 5/1982 | James et al. |
| 4,393,714 | A | 7/1983 | Schmidt |
| 4,418,981 | A | 12/1983 | Stowe |
| 4,428,239 | A | 1/1984 | Johnston |
| 4,572,669 | A | 2/1986 | James et al. |
| 4,576,479 | A | 3/1986 | Downs |
| 4,583,228 | A | 4/1986 | Brown et al. |
| 4,596,466 | A | 6/1986 | Ulrich |
| 4,606,638 | A | 8/1986 | Sommargren |
| 4,628,211 | A | 12/1986 | Ruppert |
| 4,640,616 | A | 2/1987 | Michalik |
| 4,647,203 | A | 3/1987 | Jones et al. |

(Continued)

FOREIGN PATENT DOCUMENTS

| DE | 3127333 | 1/1983 |
|---|---|---|
| DE | 3411096 | 6/1983 |
| EP | 0397388 | 11/1990 |
| EP | 0400939 | 12/1990 |
| EP | 0452993 | 10/1991 |

(Continued)

OTHER PUBLICATIONS

European Search Rept, Apr. 3, 2006, Lopushansky al.

(Continued)

*Primary Examiner*—Brian M. Healy
*Assistant Examiner*—Guy G Anderson
(74) *Attorney, Agent, or Firm*—John W. Wustenberg; Booth, Albanesi, Schroeder LLC (57) ABSTRACT

A method and apparatus for monitoring one or more environmental parameters using interferometric sensor(s), a cross-correlator, a two-dimensional photosensitive array and optical focusing means are described. The method and apparatus allows for near simultaneous monitoring of the parameter(s) of interest.

8 Claims, 8 Drawing Sheets

U.S. PATENT DOCUMENTS

| | | | |
|---|---|---|---|
| 4,648,083 A | 3/1987 | Giallorenzi | |
| 4,668,889 A | 5/1987 | Adams | |
| 4,678,909 A | 7/1987 | Jackson et al. | |
| 4,729,654 A | 3/1988 | Akuta | |
| 4,755,668 A | 7/1988 | Davis et al. | |
| 4,772,786 A | 9/1988 | Langdon | |
| 4,777,358 A | 10/1988 | Nelson | |
| 4,787,741 A | 11/1988 | Udd et al. | |
| 4,806,016 A | 2/1989 | Corpron et al. | |
| 4,844,616 A | 7/1989 | Kulkarni et al. | |
| 4,873,989 A | 10/1989 | Einzig | |
| 4,907,035 A | 3/1990 | Galburt et al. | |
| 4,914,666 A | 4/1990 | Glance | |
| 4,968,144 A | 11/1990 | Thomas et al. | |
| 4,972,077 A | 11/1990 | Willson et al. | |
| 4,995,697 A | 2/1991 | Adamovsky | |
| 5,034,603 A | 7/1991 | Wilson | |
| 5,089,696 A | 2/1992 | Turpin | |
| 5,094,534 A | 3/1992 | Cole et al. | |
| 5,119,024 A | 6/1992 | Popovic et al. | |
| 5,128,537 A | 7/1992 | Halg | |
| 5,128,798 A | 7/1992 | Bowen et al. | |
| 5,148,604 A | 9/1992 | Bantien | |
| 5,177,805 A | 1/1993 | Groger et al. | |
| 5,187,546 A | 2/1993 | Johnston | |
| 5,202,939 A * | 4/1993 | Belleville et al. | 385/12 |
| 5,202,969 A * | 4/1993 | Sato et al. | 711/143 |
| 5,218,418 A | 6/1993 | Layton | |
| 5,218,426 A | 6/1993 | Hall et al. | |
| 5,225,888 A | 7/1993 | Selwyn et al. | |
| 5,239,400 A | 8/1993 | Liu | |
| 5,247,597 A | 9/1993 | Blacha et al. | |
| 5,276,501 A | 1/1994 | McClintock et al. | |
| 5,283,625 A | 2/1994 | Bunn, Jr. | |
| 5,319,981 A | 6/1994 | Mei et al. | |
| 5,351,317 A | 9/1994 | Weber | |
| 5,361,130 A | 11/1994 | Kersey et al. | |
| 5,386,729 A | 2/1995 | Reed et al. | |
| 5,392,117 A | 2/1995 | Belleville et al. | |
| 5,400,140 A * | 3/1995 | Johnston | 356/482 |
| 5,401,956 A | 3/1995 | Dunphy et al. | |
| 5,401,958 A | 3/1995 | Berkcan | |
| 5,420,688 A | 5/1995 | Farah | |
| 5,444,724 A | 8/1995 | Goto | |
| 5,451,772 A | 9/1995 | Narendran | |
| 5,471,428 A | 11/1995 | Baroni et al. | |
| 5,477,323 A | 12/1995 | Andrews et al. | |
| 5,497,233 A | 3/1996 | Meyer | |
| 5,509,023 A | 4/1996 | Glance et al. | |
| 5,526,114 A | 6/1996 | Eselun | |
| 5,550,373 A | 8/1996 | Cole et al. | |
| 5,557,406 A | 9/1996 | Taylor et al. | |
| 5,559,358 A | 9/1996 | Burns et al. | |
| 5,631,736 A | 5/1997 | Thiel et al. | |
| 5,641,956 A * | 6/1997 | Vengsarkar et al. | 250/227.14 |
| 5,646,762 A | 7/1997 | Delavaux et al. | |
| 5,647,030 A | 7/1997 | Jorgenson et al. | |
| 5,657,405 A | 8/1997 | Fujiwara | |
| 5,682,237 A | 10/1997 | Belk | |
| 5,760,391 A | 6/1998 | Narendran | |
| 5,784,507 A | 7/1998 | Holm-Kennedy et al. | |
| 5,796,007 A | 8/1998 | Panagotopulos et al. | |
| 5,818,586 A | 10/1998 | Lehto et al. | |
| 5,835,214 A | 11/1998 | Cabib et al. | |
| 5,835,645 A | 11/1998 | Jorgenson et al. | |
| 5,847,828 A | 12/1998 | Downs | |
| 5,852,498 A | 12/1998 | Youvan et al. | |
| 5,872,628 A | 2/1999 | Erskine | |
| 5,889,590 A | 3/1999 | Duggal et al. | |
| 5,891,747 A | 4/1999 | Farah | |
| 5,910,840 A | 6/1999 | Furstenau | |
| 5,923,030 A | 7/1999 | Assard et al. | |
| 5,926,591 A | 7/1999 | Labeye et al. | |
| 5,929,990 A | 7/1999 | Hall et al. | |
| 5,949,801 A | 9/1999 | Tayebati | |
| 5,986,749 A | 11/1999 | Wu et al. | |
| 5,999,261 A | 12/1999 | Pressesky et al. | |
| 5,999,262 A | 12/1999 | Dobschal et al. | |
| 6,016,702 A | 1/2000 | Maron | |
| 6,020,963 A | 2/2000 | DiMarzio | |
| 6,057,911 A | 5/2000 | Reich | |
| 6,064,630 A | 5/2000 | Fersht et al. | |
| 6,069,686 A | 5/2000 | Wang et al. | |
| 6,075,613 A | 6/2000 | Schermer et al. | |
| 6,078,706 A | 6/2000 | Nau et al. | |
| 6,088,144 A | 7/2000 | Doerr | |
| 6,115,521 A | 9/2000 | Tran et al. | |
| 6,118,534 A | 9/2000 | Miller | |
| 6,122,415 A | 9/2000 | Blake | |
| 6,137,621 A | 10/2000 | Wu | |
| 6,151,114 A | 11/2000 | Russell | |
| 6,157,025 A | 12/2000 | Katagiri et al. | |
| 6,173,091 B1 | 1/2001 | Reich | |
| 6,178,001 B1 | 1/2001 | Kim | |
| 6,201,289 B1 | 3/2001 | Jou | |
| 6,212,306 B1 | 4/2001 | Cooper et al. | |
| 6,233,262 B1 | 5/2001 | Mesh et al. | |
| 6,272,926 B1 | 8/2001 | Fehrenbach et al. | |
| 6,281,976 B1 | 8/2001 | Taylor et al. | |
| 6,282,215 B1 | 8/2001 | Zorabedian et al. | |
| 6,289,143 B1 | 9/2001 | Berthold et al. | |
| 6,304,686 B1 | 10/2001 | Yamate et al. | |
| 6,328,647 B1 | 12/2001 | Traudt | |
| 6,330,255 B1 | 12/2001 | Hung | |
| 6,331,892 B1 | 12/2001 | Green | |
| 6,396,605 B1 | 5/2002 | Heflinger et al. | |
| 6,422,084 B1 | 7/2002 | Fernald et al. | |
| 6,425,290 B2 | 7/2002 | Willcox et al. | |
| 6,439,055 B1 | 8/2002 | Maron et al. | |
| 6,469,817 B1 | 10/2002 | Heflinger | |
| 6,486,984 B1 | 11/2002 | Baney et al. | |
| 6,490,038 B1 | 12/2002 | Jung et al. | |
| 6,492,636 B1 | 12/2002 | Chen et al. | |
| 6,492,800 B1 | 12/2002 | Woods et al. | |
| 6,496,265 B1 | 12/2002 | Duncan et al. | |
| 6,501,551 B1 | 12/2002 | Tearney et al. | |
| 6,522,797 B1 | 2/2003 | Siems et al. | |
| 6,538,748 B1 | 3/2003 | Tucker et al. | |
| 6,539,136 B1 | 3/2003 | Dianov et al. | |
| 6,545,760 B1 | 4/2003 | Froggatt et al. | |
| 6,552,799 B1 | 4/2003 | Wright et al. | |
| 6,563,986 B2 | 5/2003 | Davis et al. | |
| 6,581,465 B1 | 6/2003 | Waters et al. | |
| 6,583,882 B2 | 6/2003 | Scruggs et al. | |
| 6,594,022 B1 | 7/2003 | Watterson et al. | |
| 6,597,458 B2 | 7/2003 | Tayag et al. | |
| 6,603,560 B1 | 8/2003 | Islam | |
| 6,608,685 B2 | 8/2003 | Wood et al. | |
| 6,612,174 B2 | 9/2003 | Sittler et al. | |
| 6,621,258 B2 | 9/2003 | Davidson et al. | |
| 6,633,593 B2 | 10/2003 | Ksendzov et al. | |
| 6,636,321 B2 | 10/2003 | Bohnert | |
| 6,643,025 B2 | 11/2003 | Degertekin et al. | |
| 6,647,160 B1 | 11/2003 | Chi et al. | |
| 6,650,420 B2 | 11/2003 | Houston et al. | |
| 6,668,105 B2 | 12/2003 | Chen et al. | |
| 6,668,111 B2 | 12/2003 | Tapalian et al. | |
| 6,668,656 B2 | 12/2003 | Fernald et al. | |
| 6,680,472 B1 | 1/2004 | Thingbø et al. | |
| 6,687,011 B1 | 2/2004 | Lee et al. | |
| 6,687,036 B2 | 2/2004 | Riza | |
| 6,690,873 B2 | 2/2004 | Bendett et al. | |
| 6,714,566 B1 | 3/2004 | Coldren et al. | |
| 6,714,700 B2 | 3/2004 | Burger et al. | |

| | | |
|---|---|---|
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1 | 8/2004 | Bortz |
| 6,776,049 B2 * | 8/2004 | Johnson et al. ............... 73/841 |
| 6,785,004 B2 | 8/2004 | Kersey et al. |
| 6,791,694 B2 | 9/2004 | Pezeshki |
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,921,894 B2 | 7/2005 | Swierkowski |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | DeGroot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,355,684 B2 | 4/2008 | Jeffers et al. |
| 7,355,726 B2 | 4/2008 | Jeffers et al. |
| 7,405,829 B2 | 7/2008 | Shen |
| 7,423,762 B2 | 9/2008 | Schmidt |
| 7,434,472 B2 | 10/2008 | Leitko et al. |
| 7,492,463 B2 | 2/2009 | Lopushansky et al. |
| 7,511,823 B2 | 3/2009 | Schultz et al. |
| 2001/0013934 A1 | 8/2001 | Varnham et al. |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1 | 11/2002 | Needham et al. |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0039428 A1 | 2/2003 | Okamoto et al. |
| 2003/0043697 A1 * | 3/2003 | Vakoc ............... 367/149 |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0159518 A1 | 8/2003 | Sawatari et al. |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046859 A1 | 3/2005 | Waagaard |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 * | 10/2005 | Belleville ............... 356/504 |
| 2005/0242096 A1 * | 11/2005 | Jaghab ............... 220/254.8 |
| 2005/0244096 A1 * | 11/2005 | Jeffers et al. ............... 385/15 |
| 2006/0034569 A1 * | 2/2006 | Shih et al. ............... 385/39 |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 | 12/2008 | Riza et al. |
| 2009/0056447 A1 | 3/2009 | Berthold et al. |

FOREIGN PATENT DOCUMENTS

| | | |
|---|---|---|
| EP | 0549166 | 6/1993 |
| EP | 0571107 | 11/1993 |
| EP | 0957345 | 11/1999 |
| EP | 1586854 | 10/2005 |
| GB | 1168971 | 10/1969 |

OTHER PUBLICATIONS

"Single Mode Fiber Optics", 1983, Jeunhomme, p. 100.

Electronics Letters, vol. 22, No. 21; Oct. 9, 1986; Stevenage, GB; pp. 1097-1099; M. V. Andres et al., "Optical activation of a silicon vibrating sensor".

IEEE Proceedings D. Control Theory & Applications, vol. 135, No. 5; Sep. 1988; Stevenage, GB; pp. 364-368; M. J. Tudor et al., "Silicon resonator sensors: interrogation techniques and characteristics".

Sensors and Actuators, vol. 20, No. 102; Nov. 15, 1989; Lausanne, CH; pp. 143-151; M. W. Putty et al, "Process integration for active polysilican resonant microstructures".

Sensors and Actuators, A., vol. A21-A23, No. 1-3; Feb. 1990; Lausanne, CH; pp. 387-390; R. M. Pitcher et al., "Optothermal drive of silicon resonators: the influence of surface coatings".

Journal of Vacuum Science and Technology: Part A., vol. 8, No. 4; Jul. 1990; New York, US; pp. 3606-3613; D. W. Burns et al., "Thin films for micromechanical sensors".

Fiber Optic Sensors, Udd, 1991, p. 147.

Optical Engineering, vol. 31, No. 8; Aug. 1992; Bellingham US; pp. 1638-1642; D. Angelidis et al., "Optical micromachined pressure sensor for aerospace application".

IEEE Micro Electro Mechanical Systems Conference, Feb. 7, 1993, Ft. Lauderdale, FL; pp. 230-235; K. Aratani et al., Process and design considerations for surface icromachined beams for a tuneable.

Proc. SPIE, vol. 3762, 1999, R. L. Johnson, et al. "Miniature Instrument for the Measurement of Gap Thickness Using Polychromatic Interferometry".

Optical Fiber Sensor Technology, Grattan and Meggit, 2000, pp. 312-313.

Optical Engineering Feb. 2003, p. 431-438, Li et al., Wavelength Multiplexing of Micromechanical System Pressure and Temperature Sensors Using Fiber Bragg Gratings and Arrayed Waveguide Gratings.

IEEE Sensors Journal, vol. 3, No. 6, pp. 812-817, Dec. 2003, Tseng et al. "Polymer MEMS-Based Fabry-Perot Shear Stress Sensor".

Proc. SPIE, vol. 5589, 2004, MacDougall, Trevor W. and Sanders, Paul E., "Large Diameter Waveguide Bragg Grating Components and Their Application in Downhill Oil & Gas Sensing".

Kersey, Alan D., Fiber Grating Sensors; Journal of Lightwave Technology, vol. 15, No. 8, © 1997 IEEE, Aug. 1997.

J.R. Clowes, et al., Effects of High Temperature and Pressure on Silica Optical Fiber Sensors; IEEE Photonics Technology Letters, vol. 10, No. 3; © 1998 IEEE, Mar. 1998.

J.M. Senior, Multiplexing Techniques for Noninterferometric Optical Point-Sensor Networks: A Review, Fiber and Integrated Optics, 17:320, Copyright 1998 Taylor & Francis 1998.

Chi Chiu Chan, et al., Performance Analysis of a Time-Division-Multiplexed Fiber Bragg Grating Sensor Array by Use of a Tunable Laser Source, IEEE Journal of Selected Topics in Quantum Electronics, vol. 6, No. 5; © 2000 IEEE, Sep./Oct. 2000.

* cited by examiner

Figure 2 - White Light Modulated by the Fabry-Perot Sensor

Figure 3 – Correlation Burst from the Raw Signal on the CCD Array

Figure 4 – LASP Signal Filtered to Normalize the Signal

Figure 5A – Spectral Intensity of Tungsten and Quartz Halogen Lamps used in the LASP System Figure 5B Spectral Sensitivity of Silicon Photodiode Figure 6 - Electronic Circuit Functional Block Diagram Figure 7 – Sensor Gap versus pixel number Figure 8 Drawing of multichannel LASP

MULTI-CHANNEL ARRAY PROCESSOR

This application claims priority from U.S. Provisional Patent Application Ser. No. 60/637,959, filed Dec. 21, 2004.

FIELD OF THE INVENTION

The present invention is generally related to fiber optic array signal processors, and more particularly to an improvement over linear array signal processor systems that interrogate Fabry-Perot sensors.

BACKGROUND OF THE INVENTION

Figure 1A:
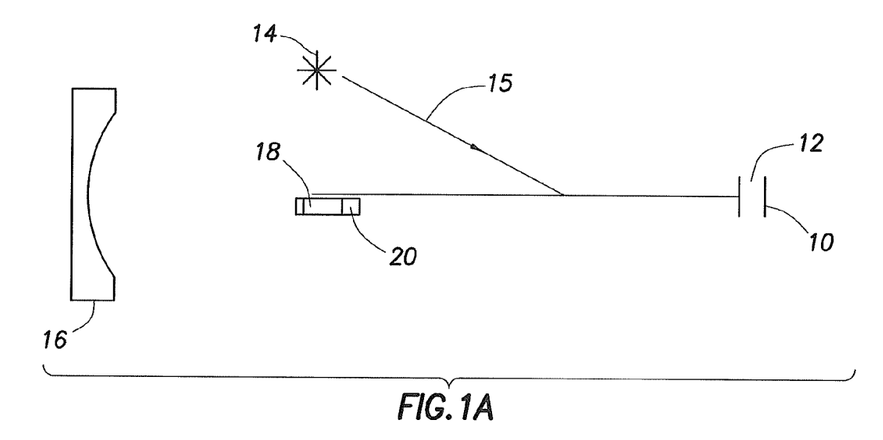
FIG. 1 is a schematic representation of the LASP system of the present invention.
Figure 1B:
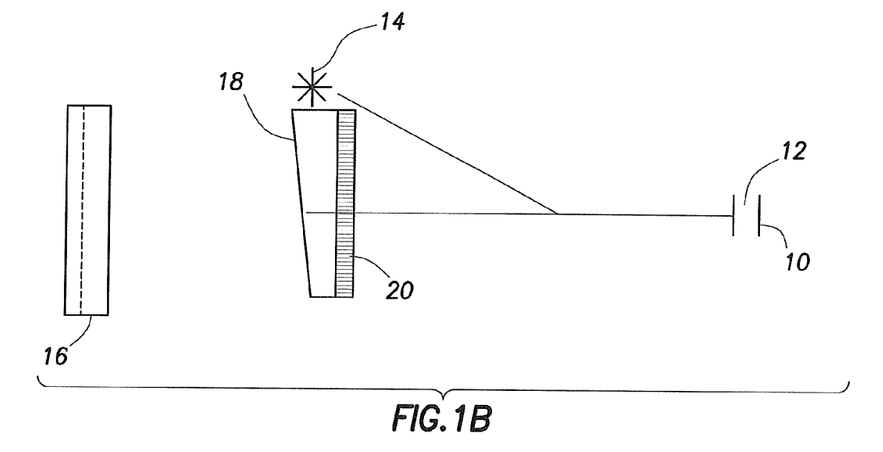
Figure 2:
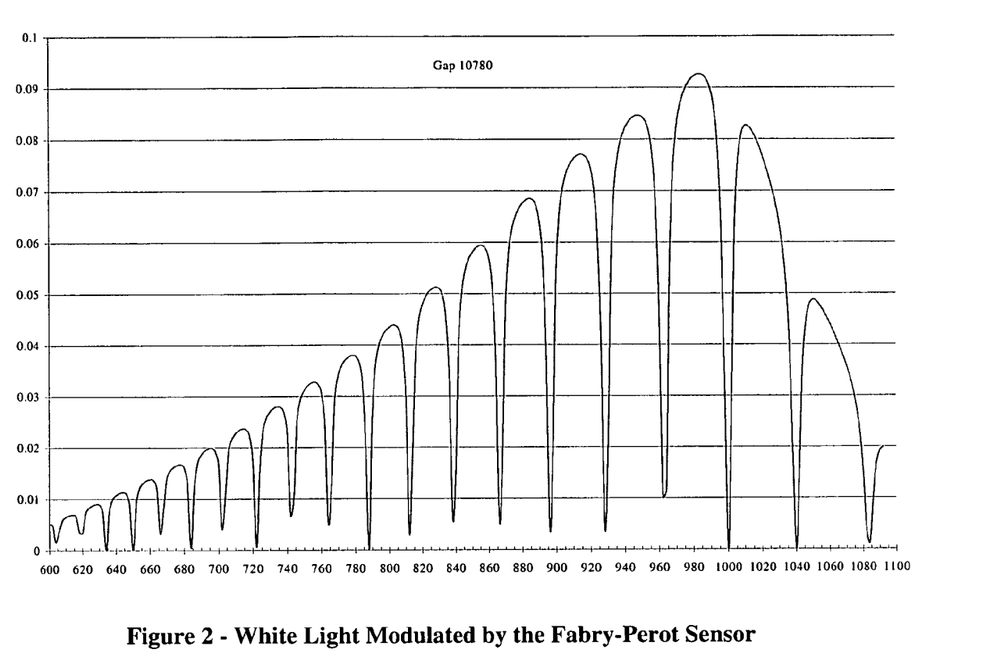
FIG. 2 is a graphical representation of white light modulated by the Fabry-Perot sensor.
Figure 5A:
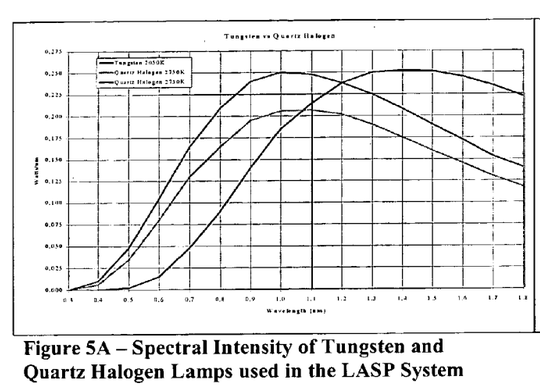
FIG. 5A is a graphical representation of the spectral intensity of Tungsten Quartz Halogen lamps used in the LASP system of the present invention.
Figure 5B:
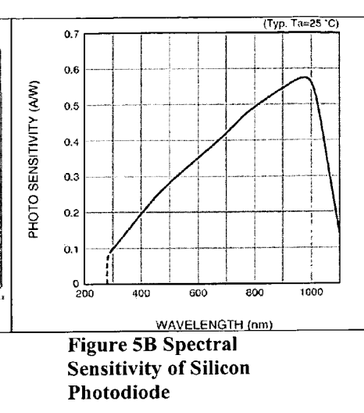
FIG. 5B is a graphical representation of the spectral sensitivity of Silicon Photodiode.

The linear array signal processor (LASP) system as seen in FIG. 1 interrogates Fabry-Perot sensors 10 that have gaps 12 ranging from 5 to 25 μm, a white light tungsten lamp 14 with spectral intensity as shown in FIG. 5. Light 15 is delivered to the sensor 10 through a 2×1 coupler. The light 15 is modulated by the sensor 10 as shown in FIG. 2 and is reflected off a cylindrical mirror 16 through a Fizeau wedge 18, with an optical thickness that ranges from 5 to 25 μm, and onto a linear silicon CCD array 20 with many pixels.

The LASP system can be multiplexed with many channels sharing a single microprocessor, however, each channel must be interrogated in time by switching each channel on and off. With the existing system, any changes that occur to the environmental parameter associated with any channel while another channel is being interrogated is lost. When many channels are multiplexed in time with the existing system, the update rate per channel is slow. The present invention provides for a system that is able to process many channels simultaneously and overcomes the limitations of the existing system.

DESCRIPTION OF THE DRAWINGS

Objects and advantages together with the operation of the invention may be better understood by reference to the following detailed description taken in connection with the following illustrations, wherein.

DETAILED DESCRIPTION

While the present invention is described with reference to the preferred embodiment, it should be clear that the present invention should not be limited to this embodiment. Therefore, the description of the preferred embodiment herein is illustrative of the present invention and should not limit the scope of the invention as claimed.

Reference will now be made in detail to the preferred embodiment of the invention as illustrated in the accompanying drawings. The present invention discloses a method for multiplexing many fiber optic channels into one LASP signal conditioner.

Figure 3:
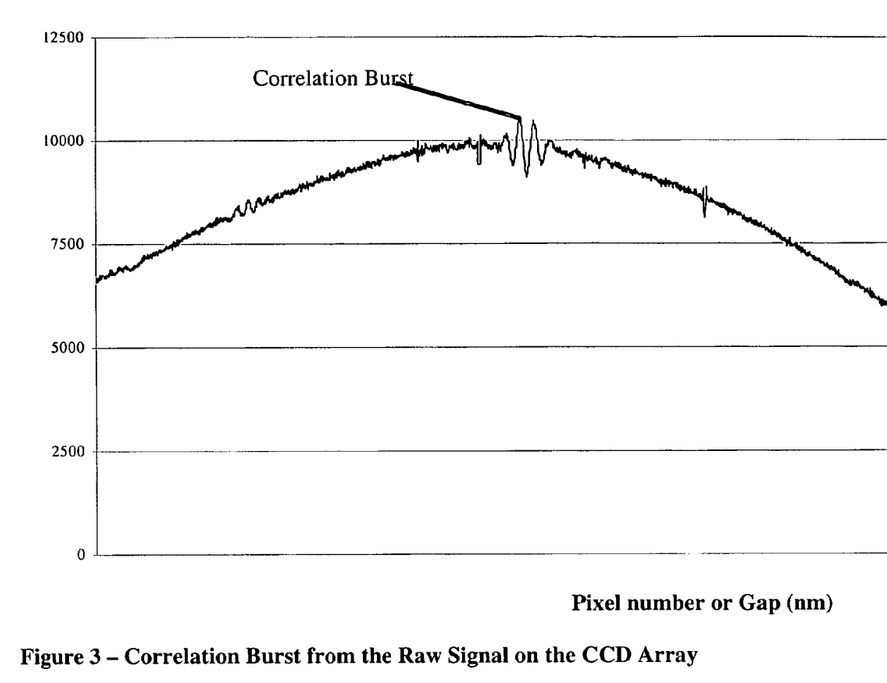
FIG. 3 is a graphical representation of the correlation burst from the raw signal on the CCD array.

Within the signal processor 30, the modulated light 31 from the sensor exits the fiber 32 as a cone shaped beam 34 and is redirected from the mirror 36 as a line with a Gaussian distribution. When the light passes through the Fizeau wedge cross correlator 38, a correlation burst as shown in FIG. 3 is created and detected by the CCD array 40. The correlation burst occurs at the precise pixel location along the CCD array 40 where the optical thickness of the Fizeau wedge 38 is precisely the same as the optical path length of the Fabry-Perot gap.

Figure 4:
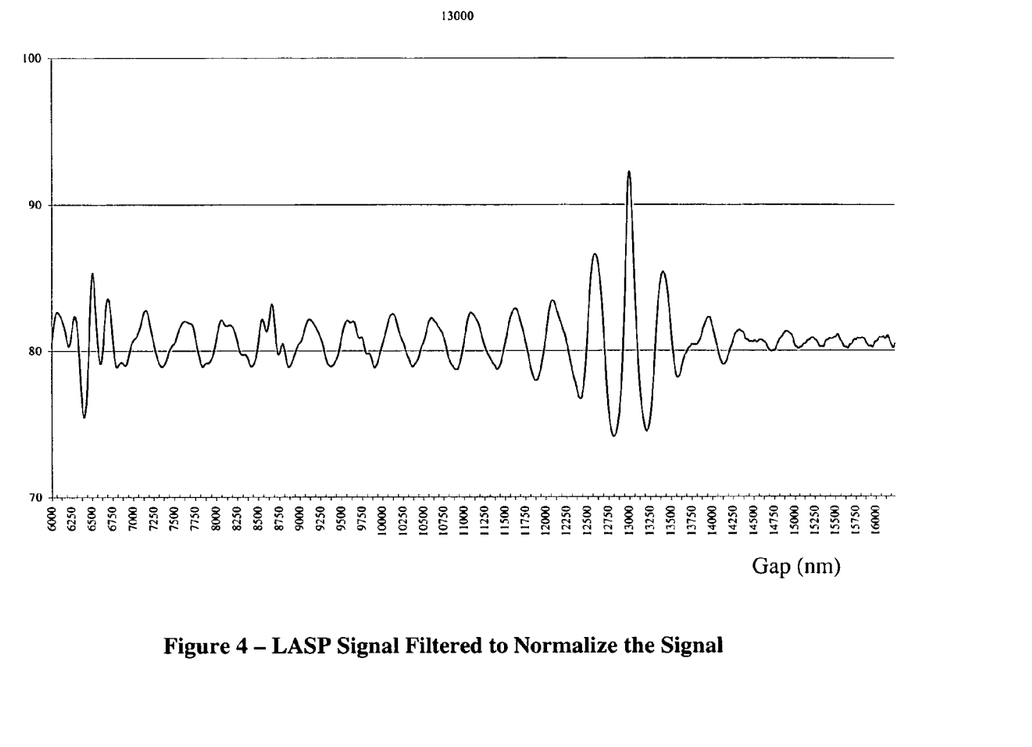
FIG. 4 is a graphical representation of an LASP signal filtered to normalize the signal.

In order to determine the peak intensity given the characteristic Gaussian distribution, normalizing the readings based on the distribution resulting in a signal that looks like the signal shown in FIG. 4 is required. A second signal processing algorithm is used to determine the precise pixel or location of the correlation burst along the CCD array. The signal conditioner then converts the Fabry Perot gap measurement into the appropriate engineering units.

Figure 6:
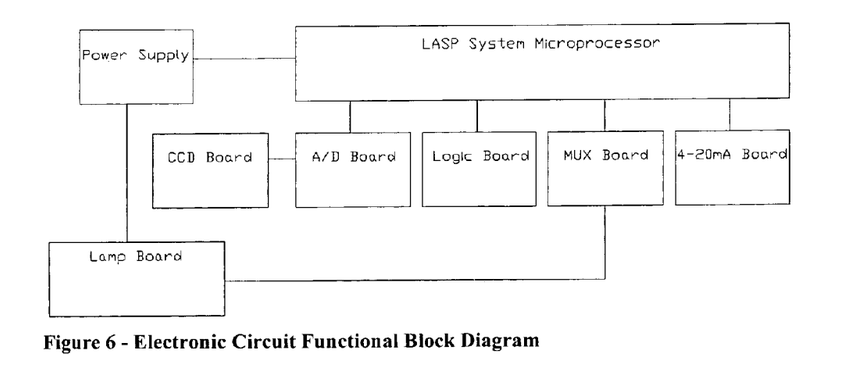
FIG. 6 is a functional block diagram of an electronic circuit of the present invention.
Figure 7:
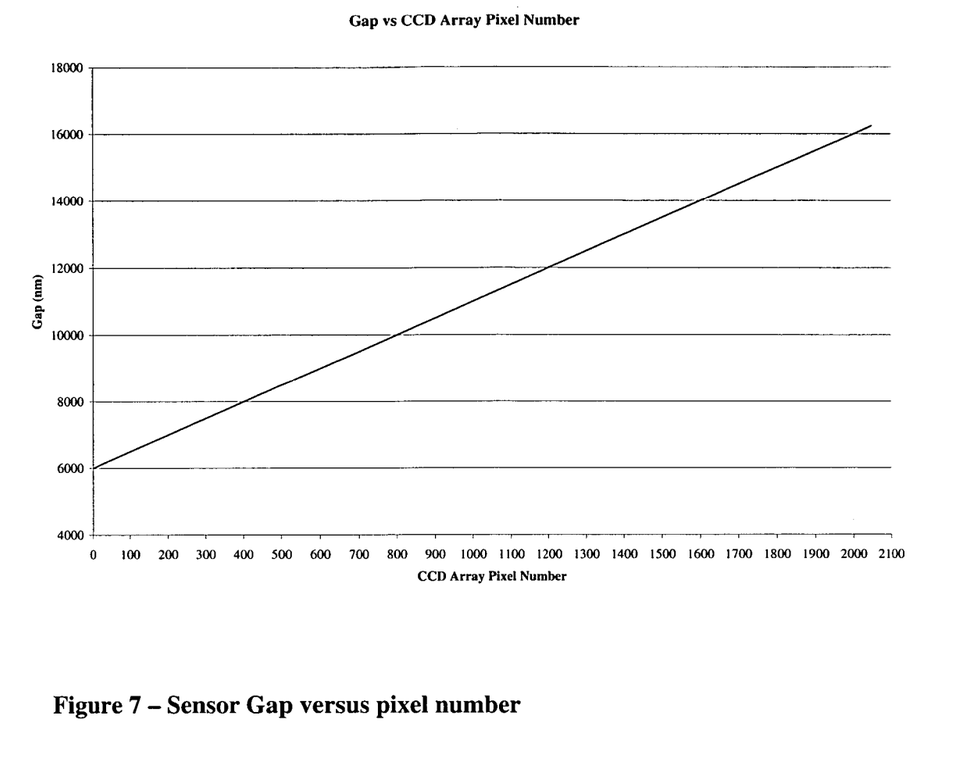
FIG. 7 is a graphical representation of the sensor gap versus pixel number.

As seen in FIG. 6, the power supply board 100 converts 110VAC to 12 VDC and 5 VDC and is used to power the microprocessor 112 and lamp board 104. The CCD board 106 generates a current proportional to the amount of light that strikes each pixel. The output of the CCD array is the input for the A/D board 108. The A/D board 108 digitizes the signal and provides an output to the logic board 110 where filtering functions are performed. The program in the microprocessor determines which channel is on and switches the lamps on in sequence. The output of the system is a serial digital output 112, i.e., RS-232 or 4-20 mA output During calibration of the signal conditioner, the determination of the precise thickness of the wedge at each pixel along the CCD array is required. During the calibration of the sensor, calibration constants are entered into a file that are used to convert the gap into the appropriate engineering units, i.e., pressure or temperature. A calibration plot of sensor gap versus CCD pixel number is shown in FIG. 7.

Figure 8:
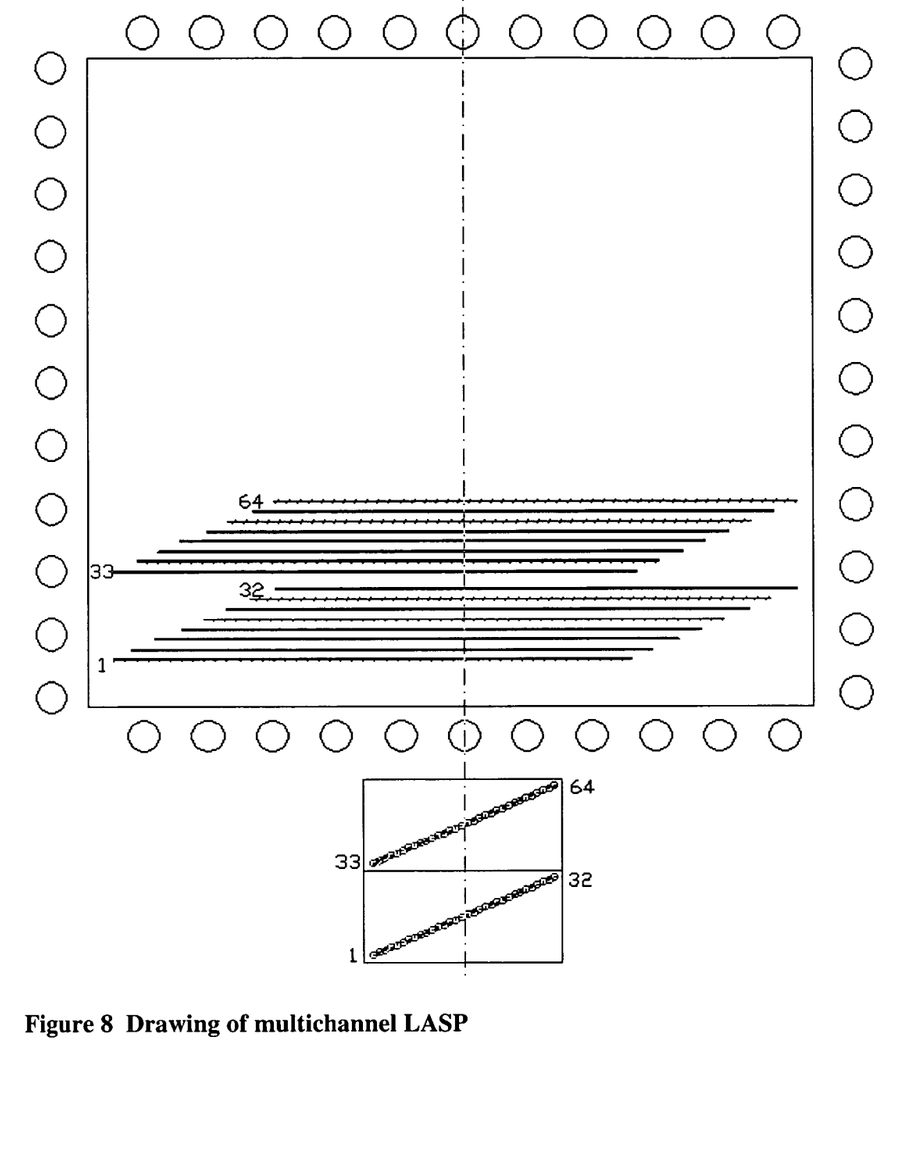
FIG. 8 is a diagrammatical representation of a multi-channel LASP of the present invention.
Figure 9A:
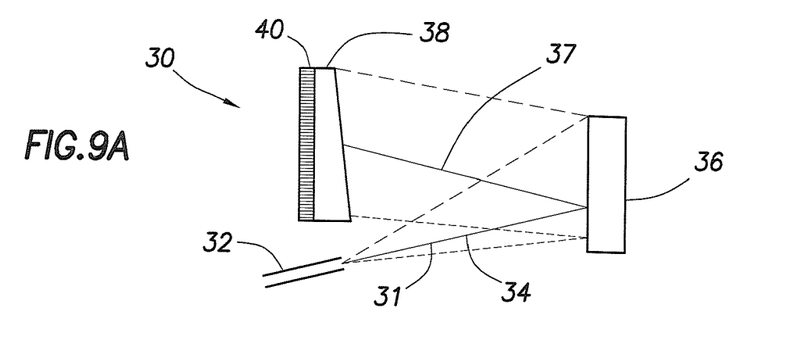
FIG. 9 is a diagrammatical representation showing the location of one optical fiber in relation to 2-D CCD and the mirror.
Figure 9B:
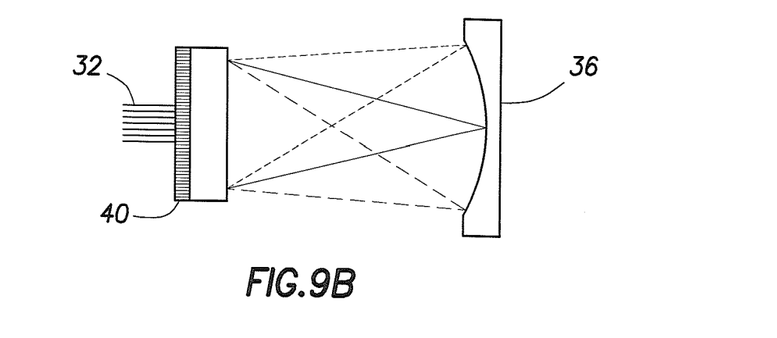
Figure 9C:
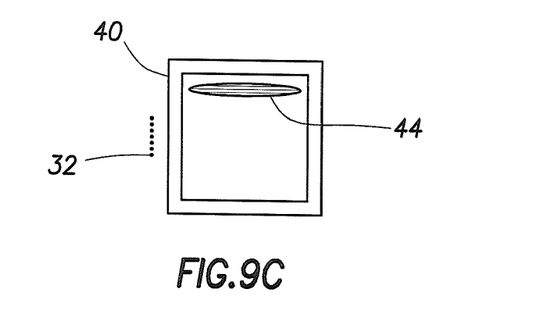

The method uses a two-dimensional (2-D) CCD array, e.g. 25 mm square, rather than the one-dimensional array used in the standard LASP described above. The 2-D array provides the capability to multiplex a large number of sensor signals from many fiber optic channels as shown in FIGS. 8, 9. Referring first to FIG. 8, which shows the mapping of 64 optical fibers onto a 2-D CCD array. The cone shaped beam of light from each fiber is converted to a line shaped beam (beam line) of light by the cylindrical mirror shown in FIG. 9. Each of the beam lines represents a separate channel and each beam line is projected onto the array at slightly different elevations corresponding to the difference in the vertical spacing between the fibers. The horizontal position of each beam line is staggered in the same manner as the fibers that deliver the light.

Figure 10:
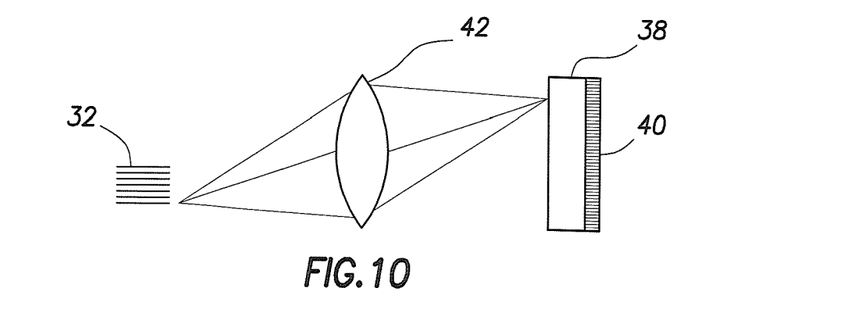
FIG. 10 Diagram showing location of one fiber in relation to 2-D CCD and lens.

A cylindrical lens 42 could be substituted for the cylindrical mirror 36 defined above (see FIG. 10). The use of a lens instead of a mirror would double the length of the system shown in FIG. 9 and the lens would need to be corrected for chromatic aberration or other changes could be made to accommodate the wider beam line that would result from an uncorrected lens.

The polished fiber ends may be arranged in a variety of ways and held in a mounting block. In the preferred embodiment, sixty-four fibers are arranged side by side in two parallel V-blocks that are tilted at a slight angle as shown in FIG. 8. The angle of tilt is determined to assure each beam line is offset from other beam lines such that, for example, the beam line from fiber 32 at the end of the first row does not interfere with the beam line from fiber 33 at the start of the next row.

FIG. 9 illustrates how light that exits from one fiber (point source) 32 is transformed from a cone 34 into a line 37. The diverging light from the fiber fills the cylindrical mirror 36 and is reflected. In one dimension the light continues to diverge. In the other dimension, the light is focused into a narrow beam. The combination forms the beam line.

A Fizeau wedge 38, e.g. 25 mm square, changes thickness in one dimension only and covers the CCD array 40 as observed in the top view of FIG. 9. The 'tear-drop' shape 44 of the beam line 37 shown in the front view in FIG. 9 is a result of coma aberration. This aberration can be corrected by aspheric correction of the curvature of the mirror.

There is also a wavelength shift caused by chromatic dispersion through the wedge. It is necessary to correct for the chromatic dispersion in the signal processing algorithm.

The two-dimensional CCD array of the present invention permits multiplexing of a large number of sensor signals. This approach enables a significant increase in the update rate per channel compared to the standard LASP.

Having thus described the invention, we claim:

1. A fiber optic sensing system for monitoring an environmental parameter comprising:
    a light source;
    a optical fiber;
    at least one interferometric sensor positioned outside the optical fiber and which modulates light received from the light source in response to changes in an environmental parameter;
    an optical cross-correlator which receives the modulated light;
    a two-dimensional photosensitive detector array; and
    optical focusing means for providing the modulated light to the two-dimensional photosensitive detector array, where the optical focusing means focuses the modulated light from a two-dimensional beam to a line beam wherein the optical focusing means comprises a cylindrical mirror.

2. A fiber optic sensing system for monitoring an environmental parameter comprising:
    a light source;
    a optical fiber;
    at least one interferometric sensor positioned outside the optical fiber and which modulates light received from the light source in response to changes in an environmental parameter;
    an optical cross-correlator which receives the modulated light;
    a two-dimensional photosensitive detector array; and
    optical focusing means for providing the modulated light to the two-dimensional photosensitive detector array, where the optical focusing means focuses the modulated light from a two-dimensional beam to a line beam wherein the optical focusing means comprises a cylindrical lens.

3. A system according to claim 1 wherein the optical cross-correlator is interposed between the two-dimensional photosensitive detector array and the optical focusing means.

4. A system according to claim 1 having a plurality of interferometric sensors, each of said interferometric sensors modulating light received from the light source in response to changes in a plurality of respective environmental parameters.

5. A method for monitoring at least one environmental parameter using a two-dimensional detector and at least one interferometric sensor that modulates light in response to the environmental parameters, the method comprising:
    providing light through an optical fiber to at least one interferometric sensor positioned outside the optical fiber, said interferometric sensor modulating the light in response to a corresponding environmental parameter;
    focusing and optically cross-correlating the modulated light so that the light is focused from a two-dimensional beam to a line beam and provided to the two-dimensional detector having a plurality of light sensing units;
    scanning the plurality of light sensing units to identify a correlation burst for each interferometric sensor and creating an output representative of each environmental parameter being monitored; and
    providing an optical cross-correlator to optically cross-correlate the modulated light; and calibrating the two-dimensional detector so that each light sensing unit is associated with an optical thickness of the optical cross-correlator.

6. A method according to claim 5, further comprising the step of calibrating the two-dimensional detector so that each light sensing unit is associated with a specific channel in the multiplexed signal conditioner.

7. A method according to claim 5, further comprising the steps of:
    providing an optical cross-correlator to optically cross-correlate the modulated light; and calibrating the two-dimensional detector so that each light sensing unit is associated with a specific channel in the multiplexed signal conditioner and so that each light sensing unit is also associated with an optical thickness of the optical cross-correlator.

8. A method according to claim 5, wherein light is provided to a plurality of interferometric sensors and wherein a plurality of outputs are created with each scan.

\* \* \* \* \*